(12) United States Patent
Brühwiler

(10) Patent No.: US 8,915,707 B2
(45) Date of Patent: Dec. 23, 2014

(54) EXHAUST GAS HOUSING FOR A GAS TURBINE AND METHOD FOR PRODUCING SAME

(75) Inventor: Eduard Brühwiler, Turgi (CH)

(73) Assignee: Alstom Technology Ltd., Baden (CH)

( * ) Notice: Subject to any disclaimer, the term of this patent is extended or adjusted under 35 U.S.C. 154(b) by 873 days.

(21) Appl. No.: 13/152,714

(22) Filed: Jun. 3, 2011

(65) Prior Publication Data

US 2011/0302929 A1    Dec. 15, 2011

(30) Foreign Application Priority Data

Jun. 10, 2010    (CH) ...................................... 0922/10

(51) Int. Cl.
  *F01D 25/24*    (2006.01)
  *F02C 7/24*    (2006.01)
  *F01D 25/30*    (2006.01)
  *F01D 9/04*    (2006.01)

(52) U.S. Cl.
  CPC ............. *F02C 7/24* (2013.01); *F05D 2230/232* (2013.01); *F01D 25/30* (2013.01); *F05D 2230/60* (2013.01); *F01D 9/044* (2013.01); *F05D 2240/12* (2013.01); *F05D 2260/96* (2013.01); *F01D 25/24* (2013.01)
  USPC ...................................................... 415/215.1

(58) Field of Classification Search
  CPC ...... F01D 25/28; F01D 25/24; F05D 2240/12
  USPC ................... 415/196, 215.1, 208.2
  See application file for complete search history.

(56) References Cited

U.S. PATENT DOCUMENTS

| 3,617,685 | A | * | 11/1971 | Brill-Edwards et al. . | 219/121.14 |
| 2003/0185673 | A1 | | 10/2003 | Matsumoto et al. | |
| 2005/0022501 | A1 | | 2/2005 | Eleftheriou et al. | |
| 2007/0234706 | A1 | | 10/2007 | Gagneux et al. | |
| 2007/0241257 | A1 | * | 10/2007 | Eleftheriou et al. .......... | 248/554 |
| 2010/0132374 | A1 | | 6/2010 | Manteiga et al. | |

FOREIGN PATENT DOCUMENTS

| DE | 102009044103 A1 | 6/2010 |
| FR | 1234975 A | 7/1960 |
| WO | 03020469 A1 | 3/2003 |
| WO | 2004016911 A1 | 2/2004 |
| WO | 2009157817 A1 | 12/2009 |

* cited by examiner

Primary Examiner — Edward Look
Assistant Examiner — Adam W Brown
(74) Attorney, Agent, or Firm — Buchanan Ingersoll & Rooney PC

(57) ABSTRACT

An exhaust gas housing for a gas turbine is provided and includes a support structure, which, arranged concentrically, includes an outer ring and an inner ring which are interconnected by radially arranged struts, and a flow liner, which is attached inside the support structure and, arranged concentrically, includes an outer liner and an inner liner which are interconnected by radially arranged liner ribs. The liner ribs each encompass the struts of the support structure, and the outer and inner liners inside the support structure form an annular passage for the turbine's hot exhaust gases. The liner ribs are welded together from front and rear parts in the flow direction, forming welded seams which extend axially in the outer liner and in the inner liner up to the liner edge. End rings, which cover the welded seams at the liner edge, are welded on the liner's rear edges for reinforcement.

11 Claims, 4 Drawing Sheets

A

A

A

EXHAUST GAS HOUSING FOR A GAS TURBINE AND METHOD FOR PRODUCING SAME

FIELD OF INVENTION

The present invention relates to the field of gas turbines. In particular, it refers to an exhaust gas housing for a gas turbine. It furthermore refers to a method for producing such an exhaust gas housing.

BACKGROUND

In FIG. 1, an exemplary gas turbine 10 is reproduced in a partially sectioned view. The gas turbine 10 from FIG. 1 comprises a rotor, rotatably mounted about a machine axis 18, with a rotor shaft 17 and a blading arrangement which on one side is part of a compressor 11 for the inducted combustion air and on the other side is part of a turbine 14 for expanding the hot gas which is produced. A combustor 13, into which an annular arrangement of burners 12 injects a fuel-air mixture for combustion, is arranged between compressor 11 and turbine 14. The combustor 13 and the adjacent turbine 14 are enclosed by an outer casing 15, onto which an annular exhaust gas housing 16 is flanged.

The exhaust gas housing 16, in relation to the principal axis, comprises a support structure (23 in FIG. 3) and a flow liner (19 in FIGS. 2-4; in FIGS. 2 and 3 only one half of the flow liner is shown in each case), which has to guide the discharging exhaust gases from the turbine 14 in an annular passage so that no flow losses occur as far as possible. In this case, the flow liner 19, as seen aerodynamically, is a part of the exhaust gas diffuser which converts the high flow velocity of the exhaust gas into pressure.

As shown in FIG. 2, the flow liner 19 comprises an annular inner liner 22, radial liner ribs 21 and an annular outer liner 20, which in the majority of applications form a unit, i.e. are welded. Naturally, the halves of the flow liner 19 (top part and bottom part) are separable in a parting plane for service reasons.

As a result of the existing struts 25 of the support structure 23, which serve for connecting an inner ring 26 and an outer ring 24, the flow liner 19 cannot be completely manufactured outside the support structure 23 and then installed. Only the part of the flow liner 19 which is shown in FIGS. 2 and 3 can be prefabricated, this part having corresponding recesses 27 at the points by which it has to be slid over the struts 25 of the support structure 23. This prefabricated part, according to FIG. 3, is then inserted (arrow) into the support structure 23 in the flow direction, and finally, according to FIG. 4, in the regions of the recesses 27 is completed by rearwards insertion and welding of correspondingly designed rear parts 30. The rear parts 30 are provided on their radial ends with fitting flanges 31, 32, on the edges 33, 34 of which the welded seams are run along.

As a result of these welds on the flow liner 19, at least two axial welded seams (35, 26 in FIG. 5) per rib are formed, specifically one each on the outer liner 20 and on the inner liner 22. If provision is made on the side of the liner 20, 22 facing away from the flow for annular reinforcing ribs (37 in FIG. 5), the reinforcing ribs 37 also have two radial welded seams each. With all these welded seams, the required quality is very difficult to achieve because their locations inside the support structure 23 are accessible only with difficulty.

During operation, the flow liner 19, as a result of the high temperatures and the flow velocity of the exhaust gases of the gas turbine, is exposed to severe vibrations and also severe thermal stresses. Moreover, the flow liner 19 has different degrees of rigidity between inner liner 22 and outer liner 20 as well as on the periphery, in the region of the ribs 21, and therebetween. As a result of these loads, cracks develop, the starting points of which—contingent upon notch factors and weakening as a result of welding—in most cases are the welded seams at the outlet of the flow liner 19 (see FIG. 5).

SUMMARY

The present disclosure is directed to an exhaust gas housing for a gas turbine. The housing including a support structure, which, in a concentric arrangement, includes an outer ring and an inner ring which are interconnected by a plurality of radially arranged struts. The housing also includes a flow liner, which is attached inside the support structure and, in a concentric arrangement, comprises an outer liner and an inner liner which are interconnected by a plurality of radially arranged liner ribs. The liner ribs each encompass the struts of the support structure, and the outer liner and the inner liner inside the support structure form an annular passage for hot exhaust gases of the gas turbine. The liner ribs are welded together from a front part and rear part in a flow direction, forming welded seams which extend axially in the outer liner and in the inner liner up to the liner edge, encompassing end rings, which cover the welded seams at a liner edge, are welded on the rear edges of the liner for reinforcement.

In another aspect, the disclosure is directed to a method for producing the above-mentioned exhaust gas housing. The method includes providing a support structure; prefabricating the flow liner with corresponding recesses, the recesses enabling axial insertion of the flow liner into the support structure. The method also includes inserting the prefabricated flow liner the support structure and completing the flow liner by welding-on the rear parts. Further, the method includes welding encompassing end rings on the rear edges of the outer liner and of the inner liner.

BRIEF DESCRIPTION OF THE DRAWINGS

The invention shall subsequently be explained in more detail based on exemplary embodiments in conjunction with the drawing. In the drawing

DETAILED DESCRIPTION OF THE PREFERRED EMBODIMENTS

Introduction to the Embodiments

It is therefore the object of the invention to disclose an exhaust gas housing for a gas turbine, which avoids the disadvantages of previous solutions and where the known assembly processes can be largely maintained, and also to propose a method for its production.

The object is achieved by the entirety of the features of claims 1 and 9. It is preferable for the invention that encompassing end rings, which cover the welded seams on the liner edge, are welded on the rear edges of the liner for reinforcement.

In one development of the invention, the end rings are comprised of half-rings in each case. As a result of this, assembly is made easier.

In another development of the invention, annularly encompassing, radially projecting reinforcing ribs are arranged on the sides of the outer liner and of the inner liner facing away from the annular passage.

The reinforcing ribs are preferably an integral component part of the end rings. This has the advantage that corresponding welded seams on the flow liner can be dispensed with.

In the case of the method according to the invention for producing the exhaust gas housing, in a first step the support structure is provided, in a second step the flow liner with corresponding recesses is prefabricated, the recesses enable axial insertion of the flow liner into the support structure, in a third step the prefabricated flow liner is inserted into the support structure, and in a fourth step the flow liner is completed by welding-on of the rear parts, wherein in a fifth step, encompassing end rings are welded on the rear edges of the outer liner and of the inner liner.

In one development of the method according to the invention, the end rings are comprised of half-rings.

According to another development, end rings, which on the side facing away from the flow have integrated reinforcing ribs, are used.

DETAILED DESCRIPTION

Figure 1:
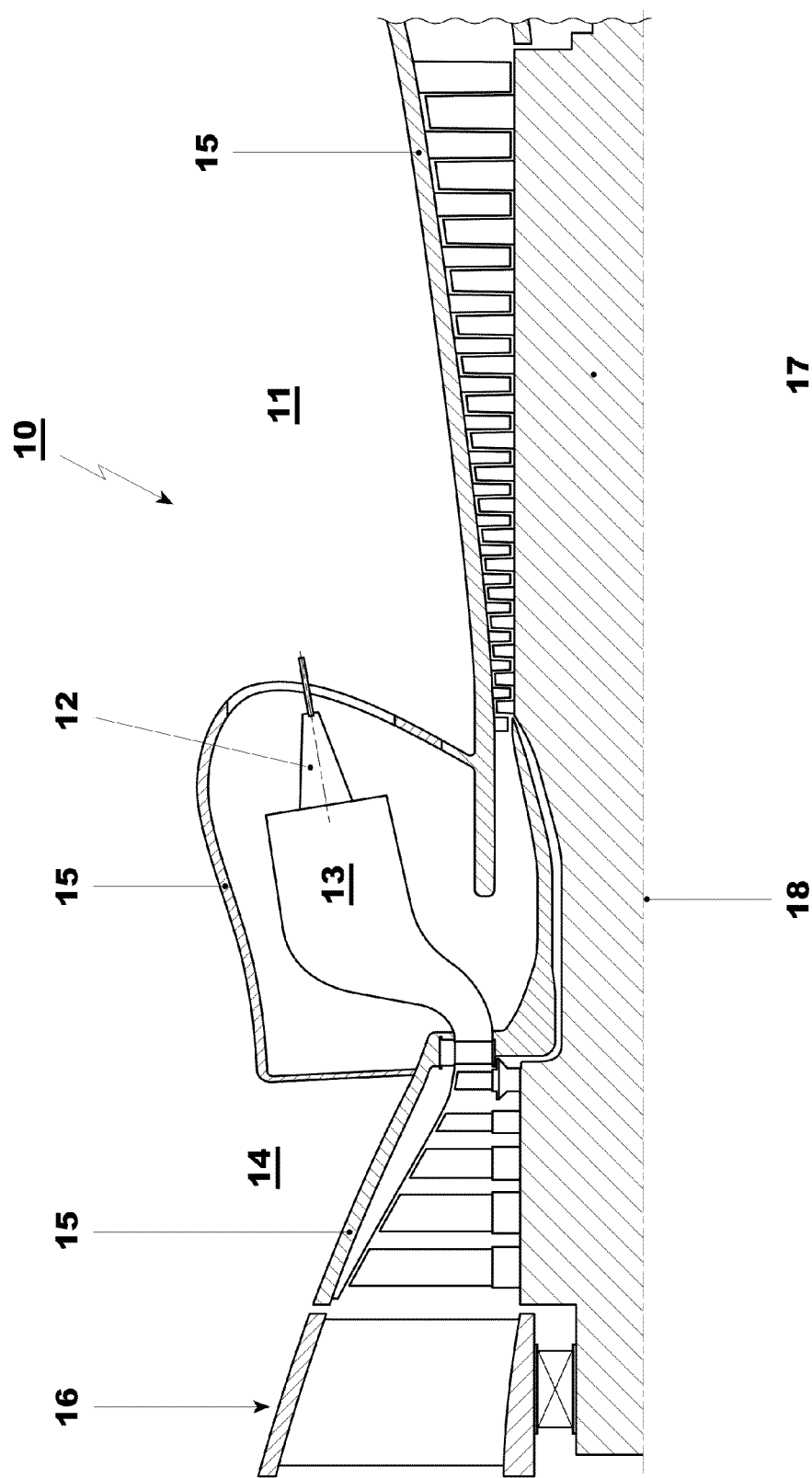
FIG. 1 shows in a partially sectioned, perspective view an exemplary gas turbine with an outlet-side exhaust gas housing.
Figure 2:
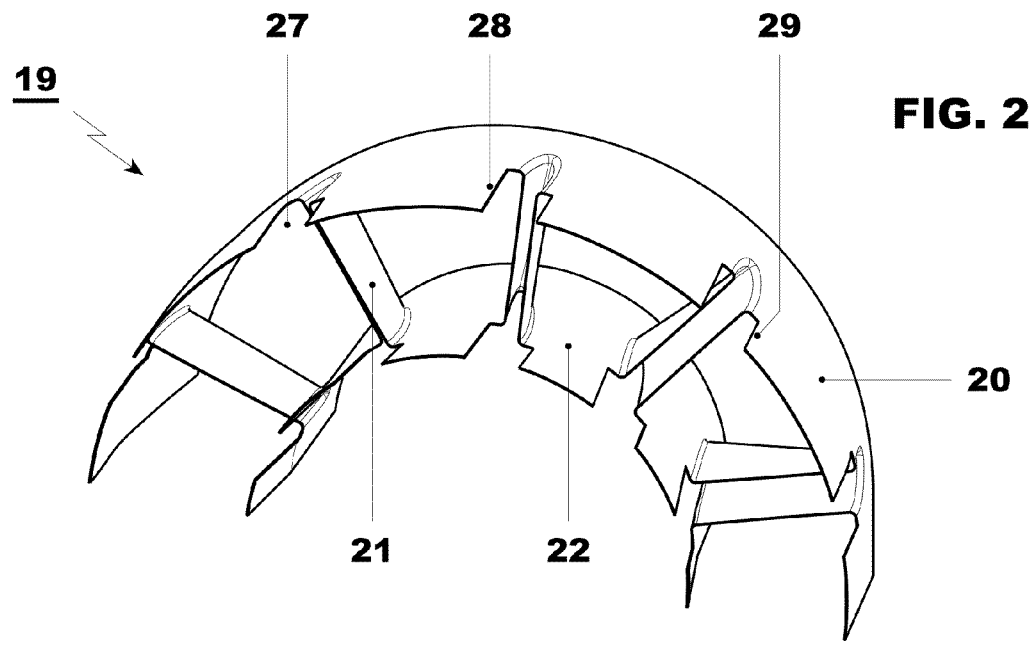
FIG. 2 shows the one half of a flow liner, which is inserted into the support structure of the exhaust gas housing, in order to form an annular flow passage for the exhaust gas.
Figure 3:
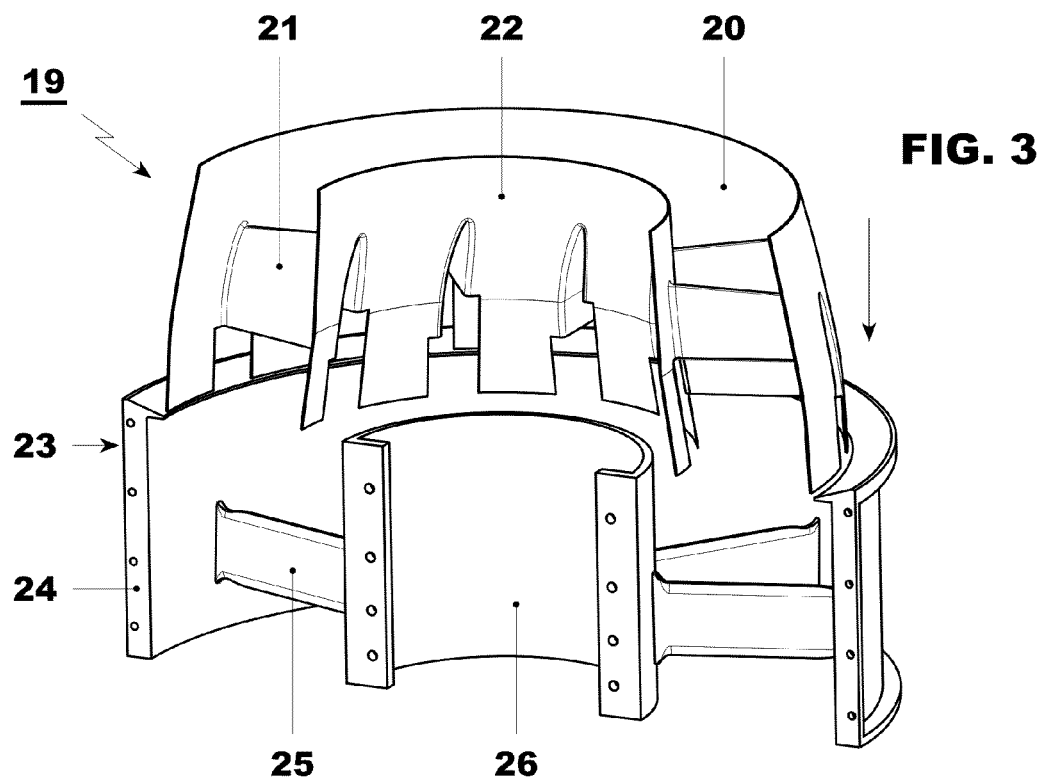
FIG. 3 shows the insertion of the flow liner from FIG. 2 into the support structure.
Figure 4:
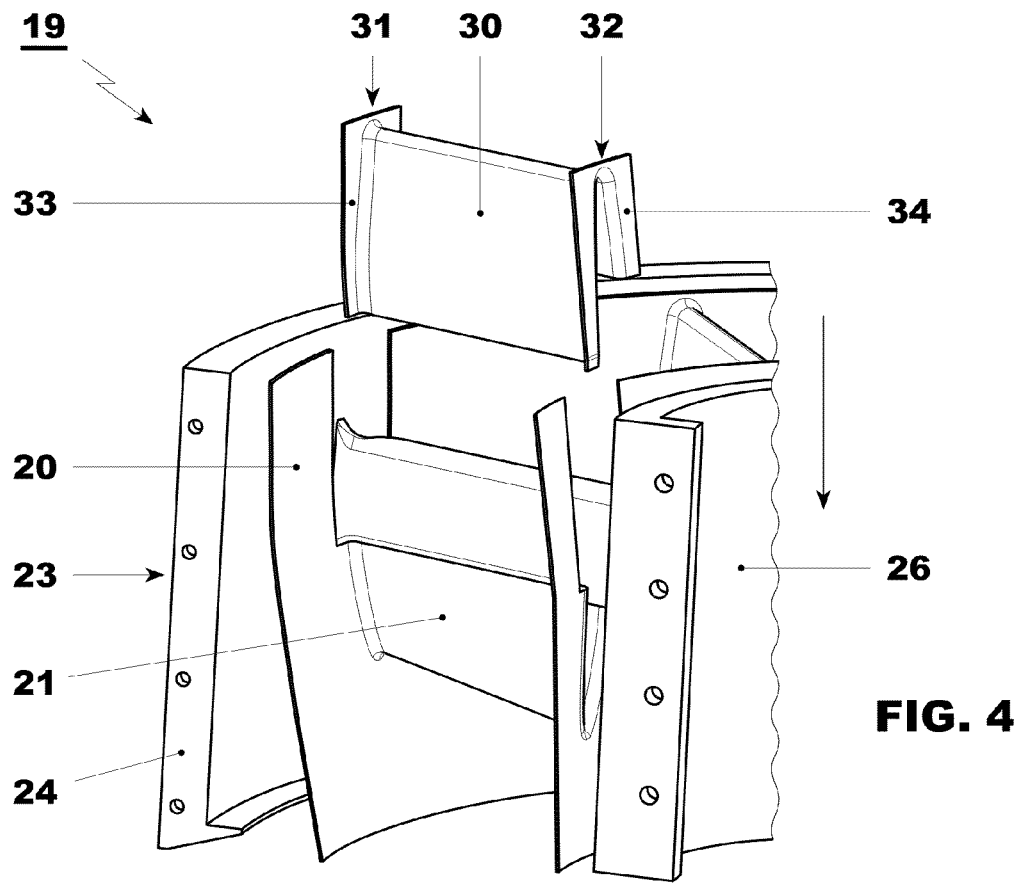
FIG. 4 shows the completion of the flow liner by the fitting and welding of corresponding rear parts.
Figure 5:
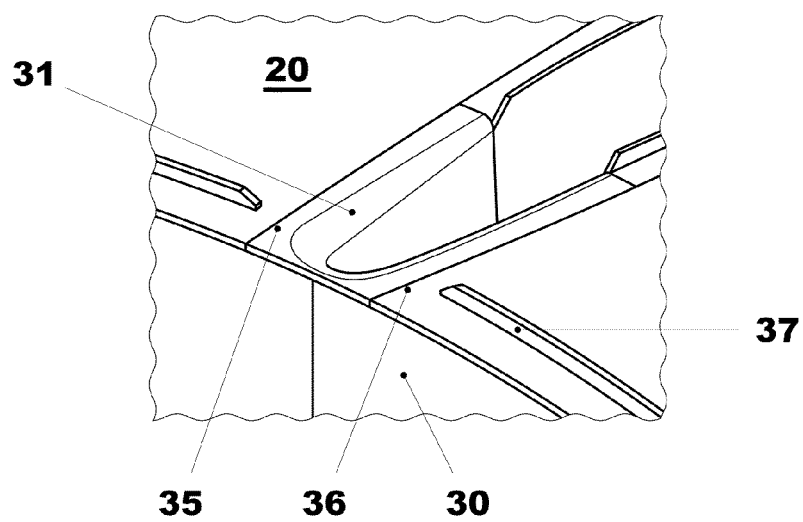
FIG. 5 shows the position of the critical welded seams between rear part and liner.
Figure 6:
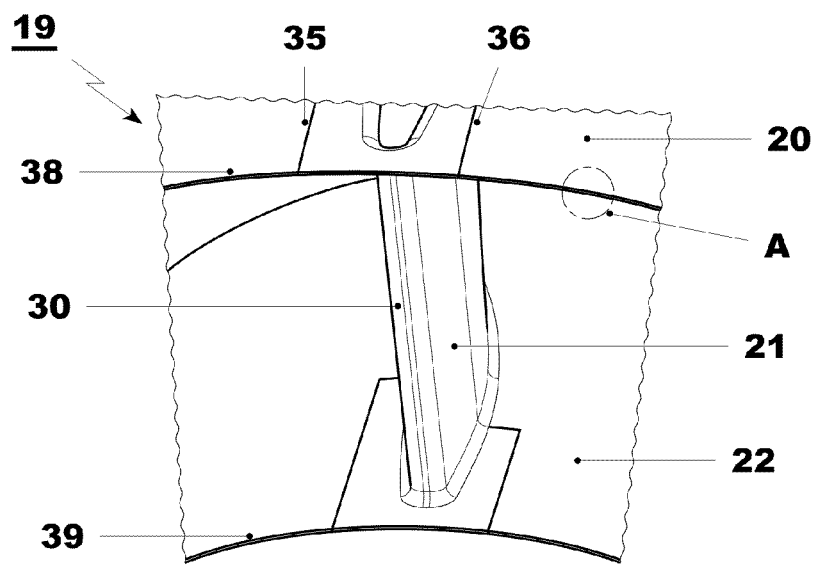
FIG. 6 shows a detail of the finish-welded flow liner with end rings attached on the rear edges, according to an exemplary embodiment of the invention.
Figure 7:
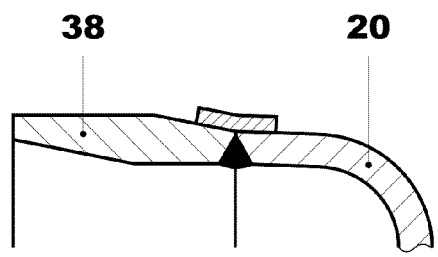
FIG. 7 shows the cross section through a welded-on end ring.
Figure 8:
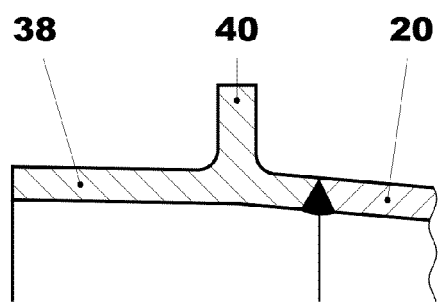
FIG. 8 shows the cross section through a welded-on end ring with integrated reinforcing rib.
Figure 9:
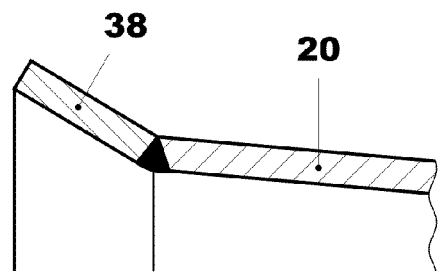
FIG. 9 shows the cross section through a welded-on end ring with conical shape.

In order to reinforce the liner on the downstream-disposed ends of the axial welded seams 35, 36 which are shown in FIG. 6, continuous end rings 38 or 39 are welded on the rear edges of the inner liner 22 and of the outer liner 20 after completion of the flow liner (FIG. 4) according to FIG. 7, FIG. 8 or FIG. 9. As a result of this, a reinforcement and a protection, in the end regions of the welded seams 35, 36, against increased crack development are created because axially running-out welded seams no longer exist.

If, according to FIG. 8, end rings 38 which have integrated reinforcing ribs 40 are used, there are no longer critical radial welded seams on the reinforcing ribs either.

It is also conceivable, however, as shown in FIG. 7, to construct the end rings 38 without reinforcing ribs, but to provide them with special cross-sectional shapes instead, that is to say to construct them, for example, with an increased thickness compared with the liner so that the end ring 38 itself acts as a reinforcement.

If the end ring 38 is constructed with integrated reinforcing ribs 40, the radial height of the reinforcing rib 40 can be varied over the circumference in order to balance out the unevenness of rigidity which is caused by the liner ribs.

When using end rings 38 according to FIG. 9, which in a conical manner are widened out away from the flow path or constricted, a reinforcing rib can also be dispensed with. The example in FIG. 9 shows a ring which is conically widened out in the flow direction, as is typically used for the wall which delimits the hot gas passage on the outside. For a ring which is part of the wall which delimits the hot gas passage towards the rotor or bearing, provision is made for a corresponding ring with a conical constriction.

The invention provides the following advantages:
there are no more axially running-out welded seams;
starts of cracks at the liner end are avoided;
higher operational reliability is achieved;
the ends of the outer liner and of the inner liner become more accurate in diameter because the corresponding rings are machined;
there are no longer any encompassing misalignments as a result of sheet welds; and
the gaps between the flow liner and adjacent structures are smaller.

The preferred embodiments of the invention which are shown serve only for explanation and are not to be interpreted as being limiting. For example, the invention is also applicable to gas turbines with two or more combustors and/or turbines.

LIST OF DESIGNATIONS

10 Gas turbine
11 Compressor
12 Burner
13 Combustor
14 Turbine
15 Outer casing
16 Exhaust gas housing
17 Rotor shaft
18 Axis
19 Flow liner
20 Outer liner
21 Liner rib
22 Inner liner
23 Support structure
24 Outer ring
25 Strut
26 Inner ring
27 Recess
28, 29 Edge
30 Rear part
31, 32 Flange
33, 34 Edge (flange)
35, 36 Welded seam (axial)
37, 40 Reinforcing rib
38, 39 End ring

What is claimed is:

1. An exhaust gas housing (16) for a gas turbine (10), comprising a support structure (23), which, in a concentric arrangement, comprises an outer ring (24) and an inner ring (26) which are interconnected by a plurality of radially arranged struts (25), and a flow liner (19), which is attached inside the support structure (23) and, in a concentric arrangement, comprises an outer liner (20) and an inner liner (22) which are interconnected by a plurality of radially arranged liner ribs (21), wherein the liner ribs (21) each encompass the struts (25) of the support structure (23), and the outer liner (20) and the inner liner (22) inside the support structure (23) form an annular passage for hot exhaust gases of the gas turbine (10), and wherein the liner ribs (21) are welded together from a front part and rear part (30) in a flow direction, forming welded seams (35, 36) which extend axially in the outer liner (20) and in the inner liner (22) up to the liner edge, encompassing end rings (38, 39), which cover the welded seams (35, 36) at a liner edge, are welded on rear edges of the liner (20, 22) for reinforcement.

2. The exhaust gas housing as claimed in claim 1, wherein the end rings (38, 39) each comprise two half-rings.

3. The exhaust gas housing as claimed in claim 1, wherein annularly encompassing, radially projecting reinforcing ribs (37, 40) are arranged on sides of the outer liner (20) and sides of the inner liner (22) facing away from the annular passage.

4. The exhaust gas housing as claimed in claim 3, wherein the reinforcing ribs (40) are integral component parts of the end rings (38, 39).

5. The exhaust gas housing as claimed in claim 3, wherein a height of the reinforcing ribs (40) is varied over its circumference.

6. The exhaust gas housing as claimed in claim 1, wherein a thickness of the end ring is greater than a thickness of the liner.

7. The exhaust gas housing as claimed in claim 1, wherein a thickness of the end ring is varied over its circumference.

8. The exhaust gas housing as claimed in claim 1, wherein the end ring is conically widened or constricted.

9. A method for producing an exhaust gas housing (16) comprising a support structure (23), which, in a concentric arrangement, comprises an outer ring (24) and an inner ring (26) which are interconnected by a plurality of radially arranged struts (25), and a flow liner (19), which is attached inside the support structure (23) and, in a concentric arrangement, comprises an outer liner (20) and an inner liner (22) which are interconnected by a plurality of radially arranged liner ribs (21), wherein the liner ribs (21) each encompass the struts (25) of the support structure (23), and the outer liner (20) and the inner liner (22) inside the support structure (23) form an annular passage for hot exhaust gases of the gas turbine (10), and wherein the liner ribs (21) are welded together from a front part and rear part (30) in a flow direction, forming welded seams (35, 36) which extend axially in the outer liner (20) and in the inner liner (22) up to the liner edge, encompassing end rings (38, 39), which cover the welded seams (35, 36) at a liner edge, are welded on rear edges of the liner (20, 22) for reinforcement, the method comprising:
providing a support structure (23);
prefabricating the flow liner (19) with corresponding recesses (27), the recesses (27) enable axial insertion of the flow liner (19) into the support structure (23);
inserting the prefabricated flow liner (19) the support structure (23);
completing the flow liner (19) by welding-on the rear parts (30); and
welding encompassing end rings (38, 39) on the rear edges of the outer liner (20) and of the inner liner (22).

10. The method as claimed in claim 9, wherein the end rings (38, 39) comprise half-rings.

11. The method as claimed in claim 9, wherein end rings (38, 39) are used, which have integrated reinforcing ribs (40) facing away from the flow on outer sides.

\* \* \* \* \*